US 8,369,521 B2

(12) United States Patent
Ward

(10) Patent No.: US 8,369,521 B2
(45) Date of Patent: Feb. 5, 2013

(54) SMART CARD BASED ENCRYPTION KEY AND PASSWORD GENERATION AND MANAGEMENT

(75) Inventor: David Ward, West Jordan, UT (US)

(73) Assignee: Oracle International Corporation, Redwood Shores, CA (US)

( * ) Notice: Subject to any disclaimer, the term of this patent is extended or adjusted under 35 U.S.C. 154(b) by 761 days.

(21) Appl. No.: 12/253,860

(22) Filed: Oct. 17, 2008

(65) Prior Publication Data

US 2010/0098246 A1     Apr. 22, 2010

(51) Int. Cl.
*H04L 9/00*         (2006.01)

(52) U.S. Cl. ......... 380/44; 380/277; 380/278; 713/168; 713/170; 713/172; 726/2; 726/3; 726/4; 726/5; 726/9

(58) Field of Classification Search ............. 380/259, 380/277, 44, 278; 713/171; 726/1–36; 705/71; 331/78
See application file for complete search history.

(56) References Cited

U.S. PATENT DOCUMENTS

| | | | | |
|---|---|---|---|---|
| 6,754,661 | B1 * | 6/2004 | Hallin et al. | 707/797 |
| 6,810,479 | B1 * | 10/2004 | Barlow et al. | 713/185 |
| 6,831,982 | B1 * | 12/2004 | Hughes et al. | 380/281 |
| 6,941,460 | B2 * | 9/2005 | Carro et al. | 713/170 |
| 7,194,618 | B1 * | 3/2007 | Suominen | 713/155 |
| 7,380,125 | B2 * | 5/2008 | Di Luoffo et al. | 713/172 |
| 7,548,620 | B2 * | 6/2009 | Popp | 380/273 |
| 7,565,536 | B2 * | 7/2009 | Vassilev et al. | 713/168 |
| 7,861,097 | B2 * | 12/2010 | Smeets et al. | 713/194 |
| 8,095,977 | B2 * | 1/2012 | Mullor et al. | 726/20 |
| 8,219,804 | B2 * | 7/2012 | Hong | 713/156 |
| 2004/0064691 | A1 * | 4/2004 | Lu et al. | 713/158 |
| 2007/0230694 | A1 * | 10/2007 | Rose et al. | 380/46 |
| 2007/0277013 | A1 * | 11/2007 | Rexha et al. | 711/164 |
| 2008/0034204 | A1 * | 2/2008 | Lakshminarayanan | 713/158 |
| 2008/0263117 | A1 * | 10/2008 | Rose et al. | 708/254 |
| 2009/0076962 | A1 * | 3/2009 | Hitchen et al. | 705/50 |

* cited by examiner

*Primary Examiner* — Christopher Brown
*Assistant Examiner* — Fahimeh Mohammadi
(74) *Attorney, Agent, or Firm* — Marger Johnson & McCollom, P.C.

(57) ABSTRACT

An apparatus can include a smart card based encryption key management system used to generate an encryption key using encryption key seed material, and an encryption key data store to store the encryption key seed material. An apparatus can include a smart card based password management system used to generate a password using password seed material, and a password data store to store the password seed material.

12 Claims, 13 Drawing Sheets

SMART CARD BASED ENCRYPTION KEY AND PASSWORD GENERATION AND MANAGEMENT

TECHNICAL FIELD

The disclosed technology pertains to password and encryption key generation and management, and more particularly to smart card based services for creating and managing passwords and encryption keys.

BACKGROUND

In the computing industry, the proper securing of sensitive information is of utmost importance. Today, there are various techniques for securing such information. One commonly used technique involves encrypting the data so that the data can only be decrypted (and thus used) by the intended individual or service. Encryption algorithms (e.g., AES, 3DES, and RC2) typically use an encryption key during the encryption and/or decryption process. In order to maintain the security of the encrypted data, however, the encryption key must be kept secret because, should the encryption key become compromised, the security of the encrypted data would be lost. Thus, the security of the data relies upon proper protection of the encryption keys.

Many of today's encryption key store services protect the encryption keys by encrypting them with an encryption key password that is a secret (i.e., known only to the user) and is used as a master key to encrypt and/or decrypt the encryption keys. Unfortunately, many of these services generate cryptographically weak encryption keys. Also, users often use sequences of letters and numbers that are easy to remember but are prone to dictionary attacks. In general, the weaker the encryption key, the weaker the system's security.

In addition, the master key is vulnerable to off-line attacks. For example, an attacker can gain physical access to a machine holding the key store, copy the key store, and then mount a password-guessing attack against the data. As soon as the attacker breaks the master password, all of the encryption keys in the store are immediately compromised.

X509 certificates are often used by processes for the securing of sensitive information and identification of trusted relationships. X509 certificates typically contain attributes describing the information in the certificate such as serial number, issuer, and subject name, for example. These attributes are usually specified in various standards documents and can be used as part of certificate validation and identification processes. In addition to the attributes internal to an X509 certificate, computer systems often need to manage and store additional information that is related to the certificate but not part of the actual certificate. The nature of the information is often application specific.

Regarding user accounts (e.g., online accounts), computer users today are often faced with the challenge of creating and managing passwords for a number of user accounts. The use of long random passwords offers some protection for their accounts, but a typical user remains prone to use weaker passwords (e.g., sequences of letters and numbers) because such passwords are easier for the user to remember. However, weak passwords can significantly lessen the security of a computer system because, for example, they can be prone to prone to dictionary attacks.

Also, in order to manage his or her multiple passwords, a user often writes down the passwords. This is a particularly unsafe practice because the user could misplace the item on which the passwords were written (e.g., a notebook or a post-it note) or, even worse, someone could obtain the user's passwords by taking the item on which the passwords were written, taking a picture of the passwords (e.g., by using a cell phone camera), or even by simply committing the passwords to memory while observing them in plain sight.

Some users purchase or subscribe to a password management software package to assist them with managing their many passwords. Many of today's password management services protect a user's passwords by using a master password to encrypt the other passwords, the idea being that the user only has to remember one password (i.e., the master password). The user's master password is thus the key used to encrypt and/or decrypt the user's other passwords. This is an appealing solution because the user only has to remember one password, but there are several security concerns. For example, the master password becomes an attack point. That is, if an attacker can gain physical access to a machine and copy the data store, the attacker can mount an off-line attack against the master password and, as soon as the master password has been broken, all of the passwords in the data store are immediately compromised.

Thus, a need remains for improved techniques pertaining to the creation and management of encryption keys and passwords.

SUMMARY

Embodiments of the disclosed technology can include a mechanism for smart card users to leverage their smart cards to enhance the generation and management of encryption keys. For example, an encryption key management service can be used to create encryption keys that are linked to an X509 certificate's private key. Such a service can use smart card based multi-factor authentication to protect an encryption key store. Also, such a service can store and manage encryption keys without having to store sensitive information on the local file system.

Embodiments of the disclosed technology can alternatively include a mechanism for smart card users to leverage their smart cards to enhance the generation and management of their passwords. For example, a password management service can be used to create passwords that are linked to the smart card's private key. Such a service can use smart card based multi-factor authentication to protect a password store. Also, such a service can store and manage passwords without having to store sensitive information on the local file system.

The foregoing and other features, objects, and advantages of the invention will become more readily apparent from the following detailed description, which proceeds with reference to the accompanying drawings.

DETAILED DESCRIPTION

Figure 1:
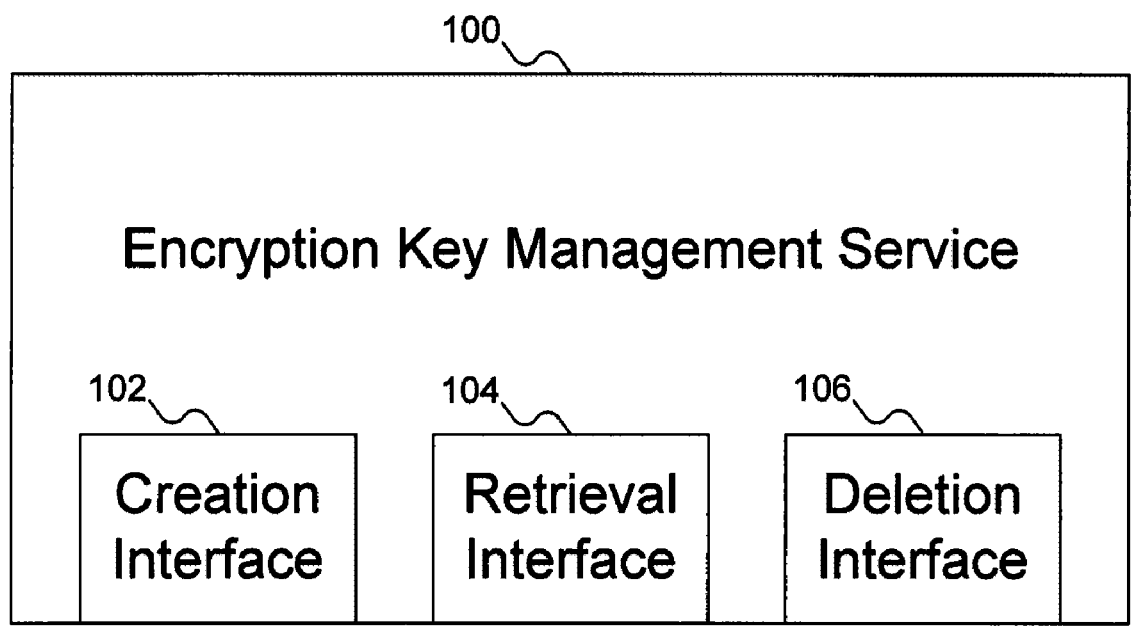
FIG. 1 shows an example of an encryption key management service in accordance with certain implementations of the disclosed technology.

A typical smart card contains an X509 certificate (e.g., a public key and other identifying materials) and a corresponding private key that is stored and managed securely by the smart card's operating system (OS). In order to access a private key on a smart card, a user generally needs to possess the physical card and also know the PIN of the smart card. Thus, smart cards effectively provide two separate factors of authentication: the PIN (e.g., something the user must know), and the card (e.g., something the user must have).

Embodiments of the disclosed technology can include an encryption key management service that, in conjunction with a properly configured smart card, smart card reader, and smart card driver software, can create, store, and manage encryption keys using the multi-factor authentication properties of smart cards. Such a service can simplify encryption key management (e.g., encryption key generation, storage, and retrieval).

In certain embodiments, the service can implement an encryption key generation algorithm to generate encryption keys that are desirably linked to the RSA private key associated with the X509 certificate's public key. The actual encryption keys are desirably not stored. Rather, the service can store the "seed material" needed to generate the encryption keys and thus advantageously generate the keys on demand.

The encryption key management service can desirably prevent off-line attacks against the key store by only storing on the local system information that is not sensitive in nature. Without having the smart card, without guessing or knowing the smart card's PIN, and without having access to the material stored on the user's machine, an attacker is unable to mount a successful off-line attack against the data store. Thus, even if an attacker were to steal the user's machine and the local data store became subsequently compromised, the encryption keys would advantageously not become compromised.

Embodiments of the disclosed technology can include a password management service that, in conjunction with a properly configured smart card, smart card reader, and smart card driver software, can create, store, and manage passwords using the multi-factor authentication properties of smart cards. Such a service can simplify password management (e.g., password generation, storage, and retrieval) and also desirably provide a way of generating strong random passwords for the user.

Embodiments of the disclosed technology can also provide a capability to generate passwords from random material. In these embodiments, a password generation algorithm desirably creates passwords that are linked to an X509 certificate's private key, thereby effectively removing the user's burden of having to come up with strong passwords. The generated passwords are desirably not stored. Rather, the service can store the material needed to generate the passwords on demand and, therefore, have no need to store the actual passwords.

The generated passwords typically cannot be regenerated without the smart card and the proper materials, thereby preventing an attacker from being able to copy the data store and mount an off-line attack against the data. Without having the user's smart card, without knowing the smart card's PIN, and without having access to the materials in the password store, an attacker is unable to mount a successful attack.

Embodiments of the disclosed technology can advantageously prevent offline attacks against a user's key store by an attacker by only storing on the local system information that is not sensitive in nature. Thus, if the user's machine is stolen and the local data store becomes compromised, the passwords themselves do not become compromised.

Exemplary Encryption Key Management Services

FIG. 1 shows an example of an encryption key management service (EKMS) 100 in accordance with certain implementations of the disclosed technology. The exemplary EKMS 100 is suitable for running on a computer having a properly configured smart card reader. In the example, the EKMS 100 has multiple service interfaces 102-106 for manipulating (e.g., creating, editing, or deleting) encryption keys.

The exemplary EKMS 100 has an encryption key creation interface 102 that can be used to request the creation of a new encryption key. In certain embodiments, the encryption key creation interface 102 can define the required encryption key length in bits (e.g., 128 bits or 256 bits), the type of encryption key (e.g., persistent (multi-use) or non-persistent (one-time-use)), and an encryption key nickname (e.g., for persistent keys). As used herein, an encryption key nickname generally refers to a user-defined string used to identify the encryption key.

The exemplary EKMS 100 also has an encryption key retrieval interface 104 that can be used to request the retrieval of a previously-generated encryption key. In certain embodiments, the encryption key nickname (e.g., specified at the time of the encryption key's creation) can be used to identify the desired encryption key.

The exemplary EKMS 100 also has an encryption key deletion interface 106 that can be used to request the deletion of a particular encryption key. In certain embodiments, the encryption key nickname (e.g., specified at the time of the encryption key's creation) can be used to identify the desired encryption key.

In the example, the EKMS 100 relies on two different types of configuration data: a list of trusted Certificate Authorities (i.e., trusted root certificates), and a designation of which certificate revocation checking method to use. For example, the certificate revocation checking method can be a Certificate Revocation List (CRL) checking method or an Online Certificate Status Protocol (OCSP) checking method. Alternatively, the configuration data can specify that no certificate revocation checking method should be used.

Figure 2A:
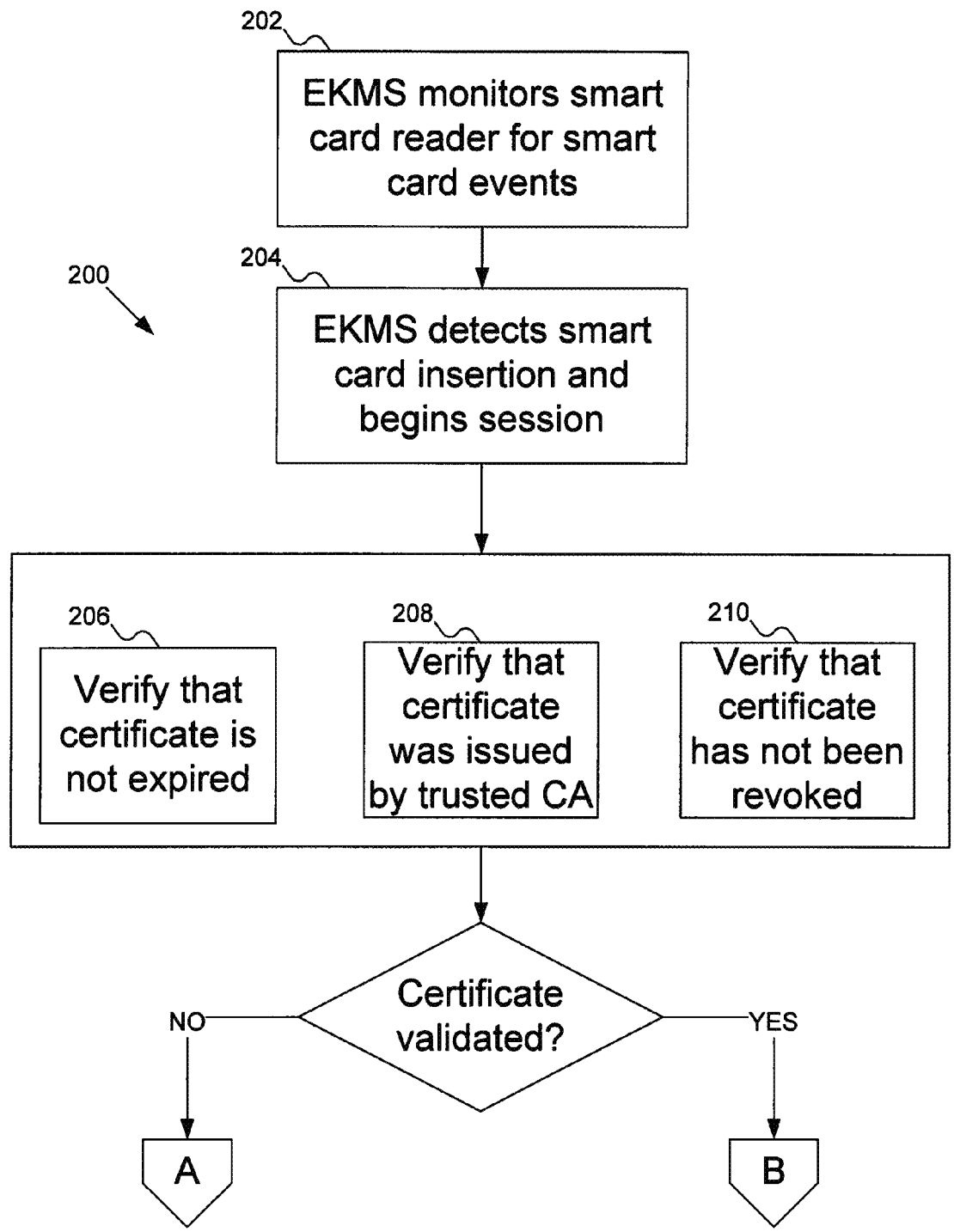
FIG. 2 shows an example of a method of encryption key management using an encryption key management service in accordance with certain implementations of the disclosed technology.
Figure 2B:
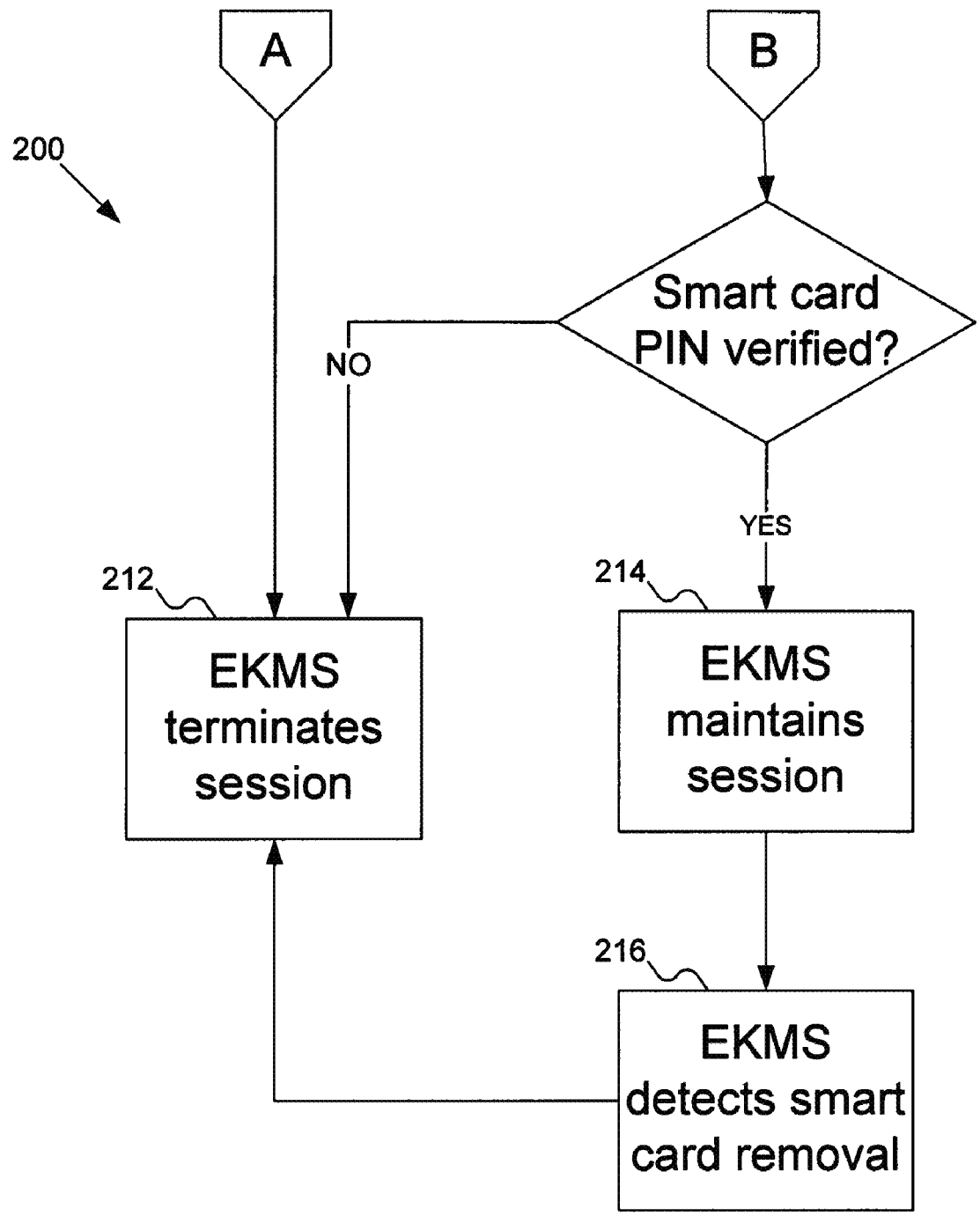

FIG. 2 shows an example of a method 200 of encryption key management using an EKMS (e.g., the EKMS 100 of FIG. 1) in accordance with certain implementations of the disclosed technology.

At 202, the EKMS monitors the smart card reader for smart card events such as smart card insertion events and smart card removal events, for example. When a smart card is inserted, the EKMS detects the event and begins a session, as shown at 204, by enumerating the X509 certificate on the smart card and attempting to validate the certificate.

In the example, the EKMS attempts to validate the certificate by performing three verifications 206-210. The EKMS can verify that the certificate is not expired (e.g., by checking the certificate's "valid from" and "valid to" date ranges), as shown at 206. The EKMS can also verify that the certificate was issued by a trusted Certificate Authority (CA), as shown at 208. In addition, the EKMS can verify that the certificate has not been revoked (e.g., using a specified certificate revocation checking method), as shown at 210.

If the EKMS is unable to validate the certificate, the EKMS terminates the session and refuses to respond to subsequent requests for encryption keys, as shown at 212.

If the EKMS is able to validate the certificate, the EKMS then attempts to verify the smart card PIN. In the example, the EKMS can perform the PIN verification by collecting the smart card PIN and presenting it to the smart card for validation.

If the smart card PIN validation fails, the EKMS closes the session and refuses to respond to subsequent requests for encryption keys, as shown at 212.

If the smart card PIN validation is successful, the EKMS maintains the session and continues monitoring the smart card reader for smart card events, as shown at 214.

When the smart card is removed from the smart card reader, the EKMS detects the smart card removal event, as shown at 216. The EKMS then closes the session and refuses to respond to requests for encryption keys, as shown at 212.

Figure 3:
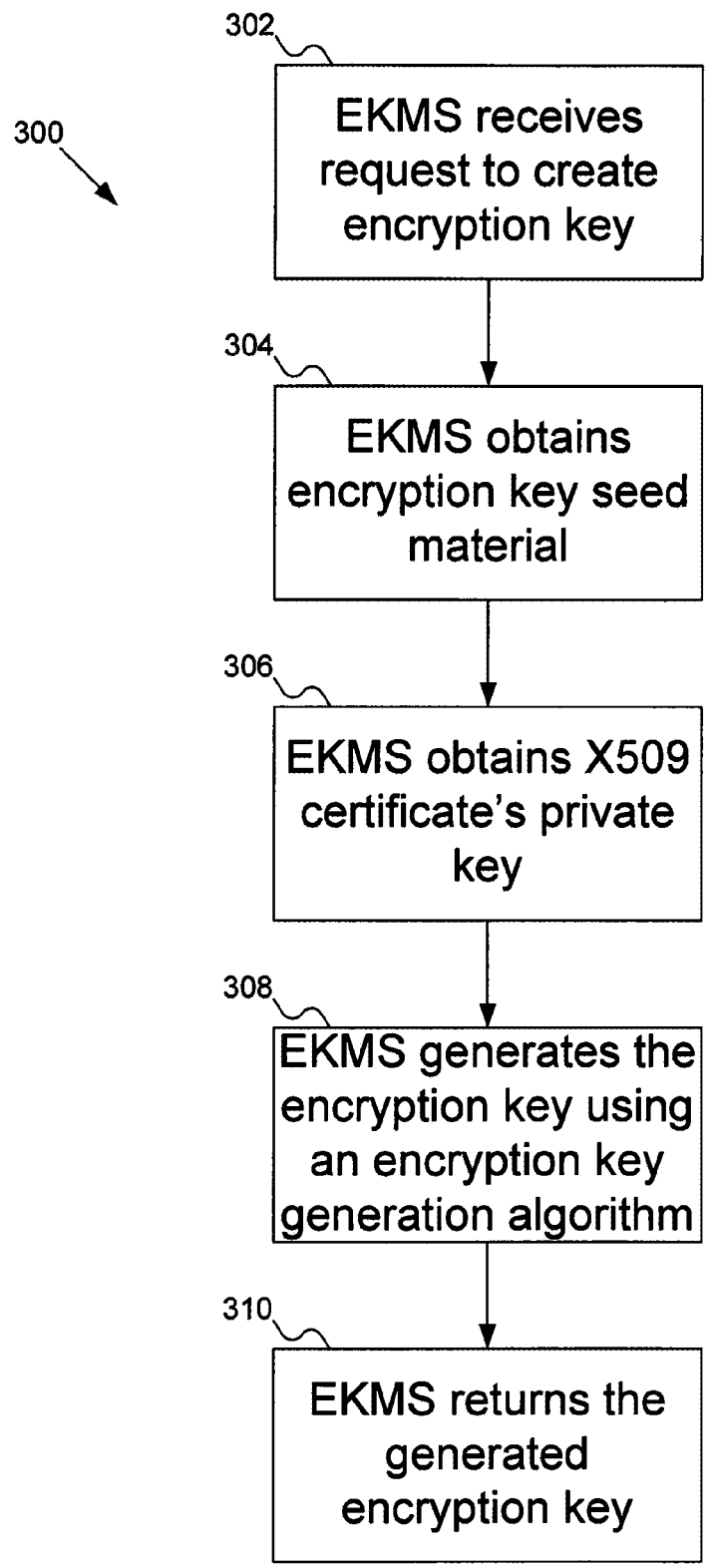
FIG. 3 shows an example of a method of generating an encryption key using an encryption key management service in accordance with certain implementations of the disclosed technology.

FIG. 3 shows an example of a method 300 of generating an encryption key using an EKMS (e.g., the EKMS 100 of FIG. 1) in accordance with certain implementations of the disclosed technology.

At 302, the EKMS receives a request to create an encryption key. The request can include information pertaining to encryption key length (i.e., n-bits), encryption key type (i.e., persistent or non-persistent), and an encryption key nickname.

At 304, the EKMS obtains seed material (e.g., n-bits of random data) using a random sequence generator, for example.

At 306, the EKMS obtains the X509 certificate's private key.

At 308, the EKMS uses an encryption key generation algorithm to generate the requested encryption key. The algorithm can be used to generate encryption keys given an X509 certificate and associated private key. For example, the algorithm can perform an RSA encryption of the seed material using the certificate's private key, where the resulting encrypted data is the encryption key. In certain embodiments, the algorithm can include additional data folding steps based on digest functions such as MD5, SHA-1, and SHA-2, for example.

In the example, the algorithm desirably has at least the following two properties: (1) given the same input, the algorithm produces the same output; and (2) the algorithm can use the RSA private key associated with the certificate to create the encryption key. This arrangement advantageously ensures that the encryption key can be re-created and that the encryption key is linked to the RSA private key.

In alternative implementations, the algorithm can be used in services designed to generate data "tokens" that need to be uniquely associated with an X509 certificate.

At 310, the EKMS returns the generated encryption key to the requestor.

Figure 4:
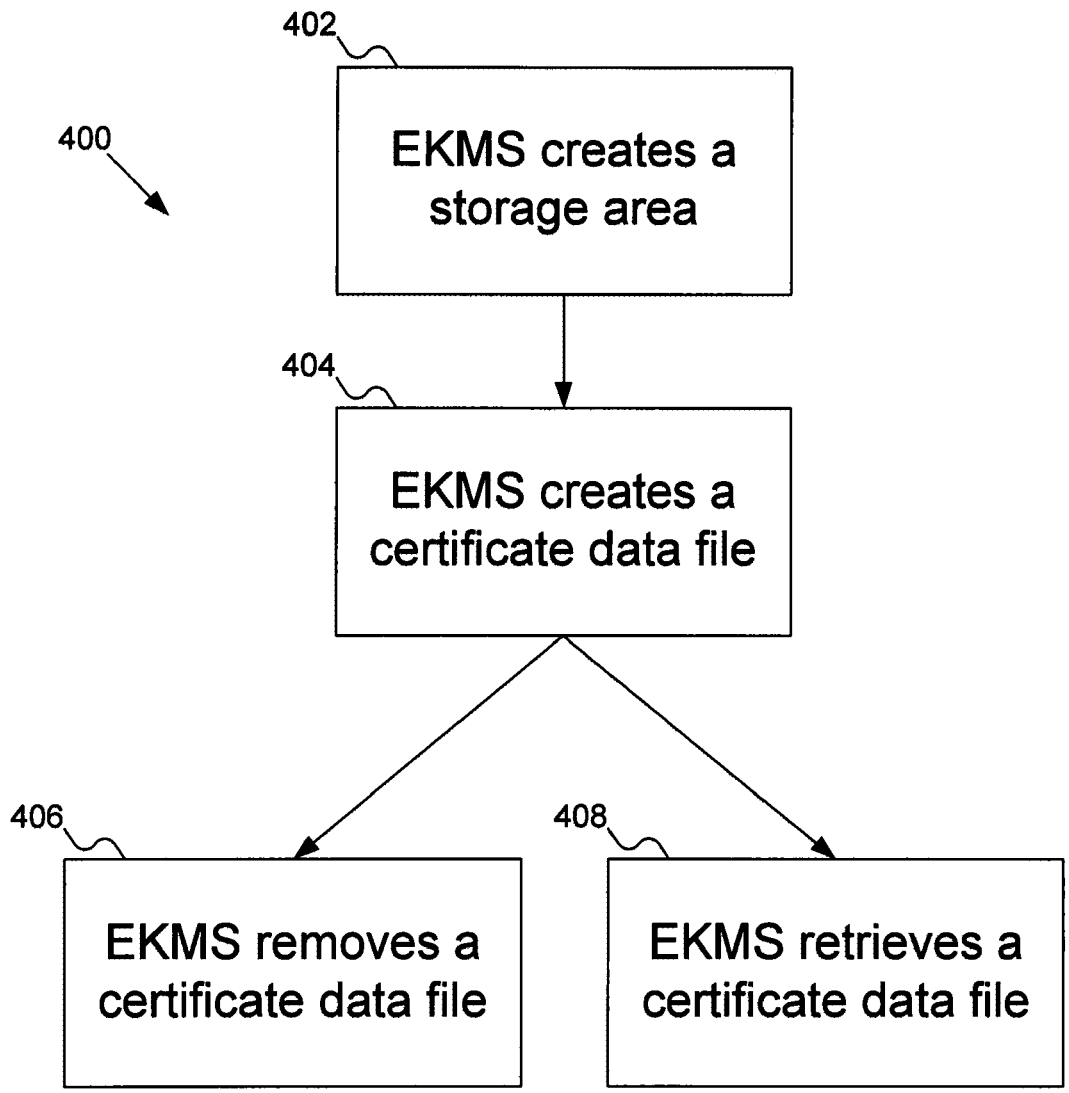
FIG. 4 shows an example of a method of storing an encryption key using an encryption key management service in accordance with certain implementations of the disclosed technology.

FIG. 4 shows an example of a method 400 of storing an encryption key using an EKMS (e.g., the EKMS 100 of FIG. 1) in accordance with certain implementations of the disclosed technology. Such implementations can include the storing of data in a manner that creates an association between the stored data and an X509 certificate (e.g., the data is not part of the X509 certificate but is related to the certificate in some manner). In such implementations, the format of the actual data stored is not necessarily defined (e.g., the application can decide which format to use) but means for quickly creating, deleting, and locating a certificate's data are desirably provided. For persistent keys, the materials needed to regenerate the key are desirably stored and managed in a data store having an ability to associate the data with an X509 certificate and return the data upon request.

At 402, the EKMS creates a storage area. For example, the EKMS can create a directory on a file system for the X509 certificate storage area. While the name of the storage area in not crucial, the name should be agreed upon and known to services that use the storage area. A chosen name can be associated with the primary purpose of the storage area (e.g., "Certificate_Encryption_Store"). A unique file can be created in the storage area for each certificate's data.

At 404, the EKMS creates a certificate data file. For example, the EKMS can create a file in the storage area for each certificate. The name of the file can be the concatenation of certain certificate attributes such as certificate serial number (e.g., encoded as hex digits) and certificate issuer name. Such a concatenation of serial number and issuer name advantageously creates a unique entry in the storage area for each certificate, thereby providing a capability to quickly locate and retrieve a specific certificate's data.

At 406, the EKMS removes a certificate data file. For example, responsive to a request to delete a certain certificate data file, the EKMS can locate the certificate's data file by building the file name (as discussed above). The EKMS can then delete the file from the file system (e.g., using appropriate interfaces for the platform).

At 408, the EKMS retrieves a certificate data file. For example, responsive to a request to retrieve a certain certificate data file, the EKMS can locate the certificate's data file by building the file name (as discussed above). The EKMS can then read the data file contents (e.g., using appropriate interfaces for the platform).

In alternative implementations, an EKMS can be used to store data needing to be associated with an X509 certificate.

In certain embodiments, materials for encryption key generation (e.g., seed material such as random data and encryption key attributes such as encryption key length and encryption key nickname) can be stored in an XML document for future use. The XML document can build an association between the encryption key material and an X509 certificate.

The storing of encryption key materials in an XML document can include converting the binary information to Base64 encoding and providing a digital signature for validation purposes (e.g., to ensure that the stored materials have not been modified). When retrieved for later use, the data can be Base64 decoded.

Exemplary XML document elements for use in connection with implementations of the disclosed technology are as follows:

<certificate_key_store> Element:
The <certificate_key_store> element is the topmost or root element of the XML document and generally describes a primary purpose of the data. This element also has the following child elements: <certificate> and <encryption_keys> (discussed below).

<certificate> Element:
The <certificate> element identifies the X509 certificate that is associated with the encryption key data store and contains the following elements: <serial_number>, <issuer>, and <digital signature>.
The <digital_signature> element (discussed below) is used to validate that the data has not been modified. The elements <serial_number> (i.e., the certificate's serial number encoded as a printable hex string) and <issuer> (i.e., the certificate's issuer) are used in the signature.

<encryption_keys> Element:
The <encryption_keys> element is a list of encryption keys in the XML document and may contain one or more <key> elements (discussed below).

<key> Element:
The <key> element identifies an individual encryption key and contains the following elements: <nickname>, <type>, <length>, <seed_material>, and <digital_signature>. The <digital_signature> element (discussed below) is used to validate that the data has not been modified. The elements <nickname> (i.e., the certificate nickname provide by the user), <type> (i.e., the type of encryption key such as permanent or non-permanent), <length> (i.e., the length of the encryption expressed in bits), and <seed_material> (i.e., the encryption key's seed material, such as random data, that is Base64 encoded) are used in the signature.

<digital_signature> Element:
The <digital_signature> element is used for validation purposes. The actual signature is generated by concatenating the listed elements and performing a digital signature using the private key for the X509 certificate. Before using the data, the signature is checked to ensure that tampering has not occurred. The signature is binary data and can be Base64 encoded before being stored in the XML document. The signature can be retrieved and Base64 decoded before being verified.
The <digital_signature> contains the following elements: <method> (i.e., the method used to create the signature, such as SHA-1 with RSA encryption), <elements> (i.e., the list of elements concatenated and signed), and <value> (i.e. the signature data, Base64 encoded).

An example of an XML document for use in connection with implementations of the disclosed technology is as follows:

```
<?xml version="1.0" encoding="UTF-8" ?>
<certificate_key_store>
  <certificate>
    <serial_number> 0a7ca9e6 </serial_number>
    <issuer> My Favorite Certificate Authority </issuer>
    <digital_signature>
      <type> SHA-1 with RSA encryption </type>
      <elements> serial_number issuer </elements>
      <value>
        <![CDATA[ZIhvcNAQEFBQAwajELMAkGA1
        UEBhMCVVMx]]>
      </value>
    </digital_signature>
  </certificate>
  <encryption_keys>
    <key>
      <nickname> first key </nickname>
      <type> permanent </type>
      <length> 128 </length>
      <seed_material>
        <![CDATA[ZIhvcNAQEFBQAwajELMAkGA1
        UEBhMCVVMx]]>
      </seed_material>
      <digital_signature>
        <type> SHA-1 with RSA encryption </type>
        <elements> nickname type length seed_material
      </elements>
        <value>
          <![CDATA[ZIhvcNAQEFBQAwajELMAkGA1
          UEBhMCVVMX]]>
        </value>
      </digital_signature>
    </key>
    <key>
      <nickname> second key </nickname>
      <type> permanent </type>
      <length> 256 </length>
      <seed_material>
        <![CDATA[ ZIhvcNAQEFBQAwajELMAkGA1
        UEBhMCVVMX]]>
      </seed_material>
      <digital_signature>
        <type> SHA-1 with RSA encryption </type>
        <elements> nickname type length seed_material
      </elements>
        <value>
          <![CDATA[ZIhvcNAQEFBQAwajELMAkGA1
          UEBhMCVVMx]]>
        </value>
      </digital_signature>
    </key>
  </encryption_keys>
</certificate_key_store>
```

Figure 5:
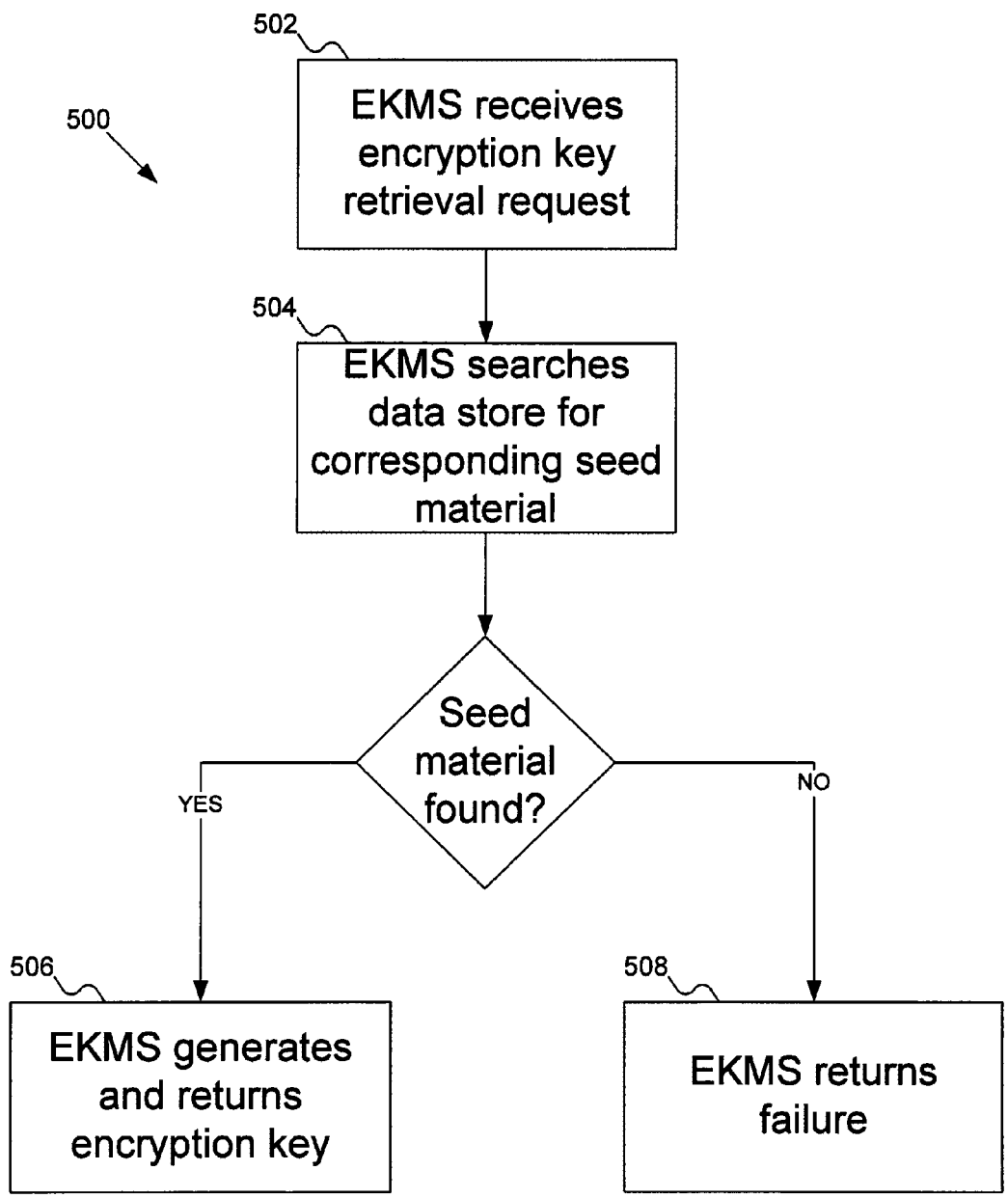
FIG. 5 shows an example of a method of retrieving an encryption key using an encryption key management service in accordance with certain implementations of the disclosed technology.

FIG. 5 shows an example of a method 500 of retrieving an encryption key using an EKMS (e.g., the EKMS 100 of FIG. 1) in accordance with certain implementations of the disclosed technology.

At 502, the EKMS receives an encryption key retrieval request. The request can contain the nickname of the desired encryption key.

At 504, the EKMS searches the data store for seed material that corresponds to the encryption key nickname and is associated with the smart card certificate.

If found, the encryption key is generated (as discussed above) and returned, as shown at 506.

If a match is not found, a failure is returned, as shown at 508.

Figure 6:
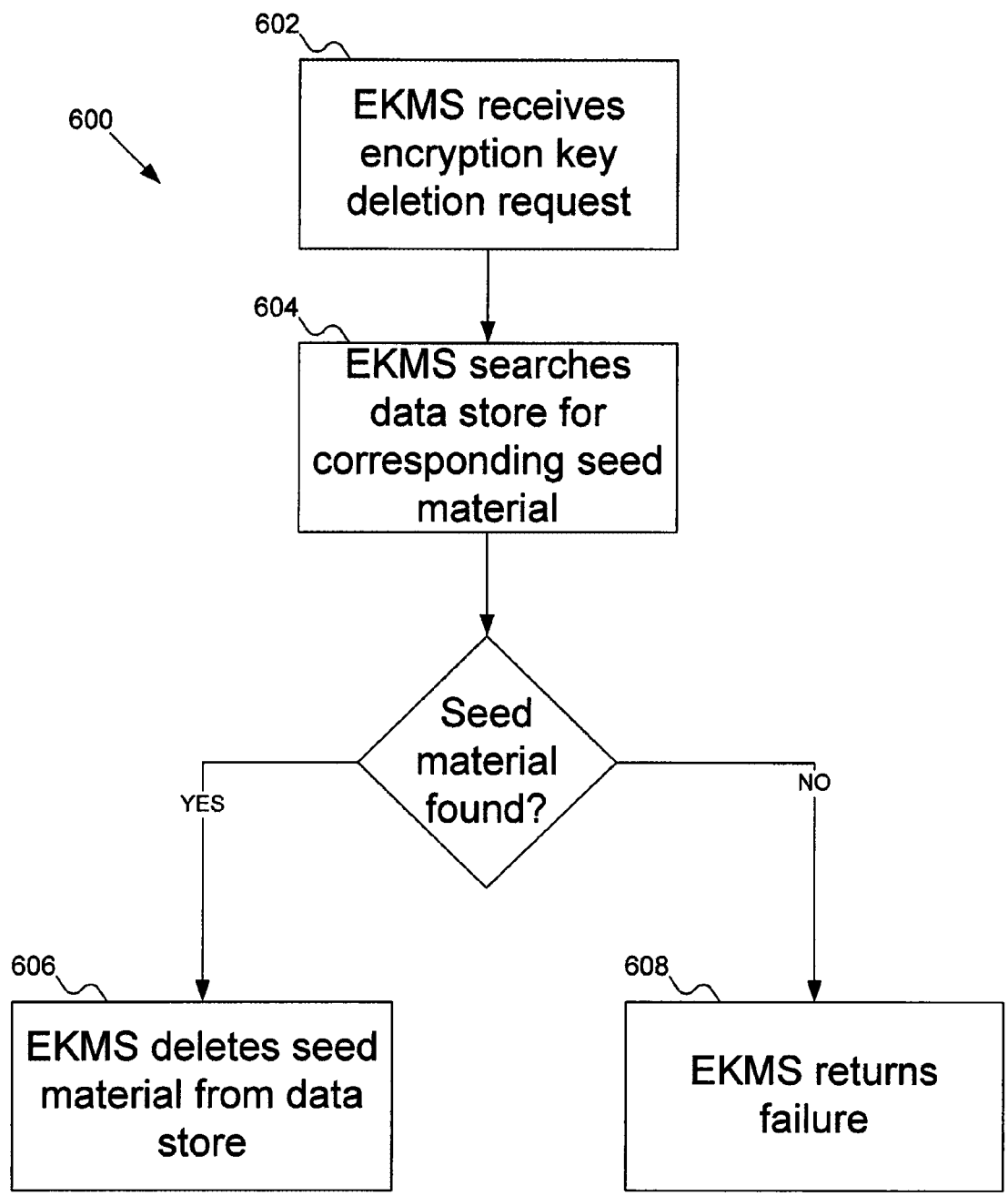
FIG. 6 shows an example of a method of deleting an encryption key using an encryption key management service in accordance with certain implementations of the disclosed technology.

FIG. 6 shows an example of a method 600 of deleting an encryption key using an EKMS (e.g., the EKMS 100 of FIG. 1) in accordance with certain implementations of the disclosed technology.

At 602, the EKMS receives an encryption key deletion request. The request can contain the nickname of the encryption key to be deleted.

At 604, the EKMS searches the data store for encryption key material that corresponds to the nickname and is associated with the smart card certificate.

If found, the seed material is deleted from the data store, as shown at 606.

If not found, a failure is returned, as shown at 608.

Exemplary Password Management Services

Figure 7:
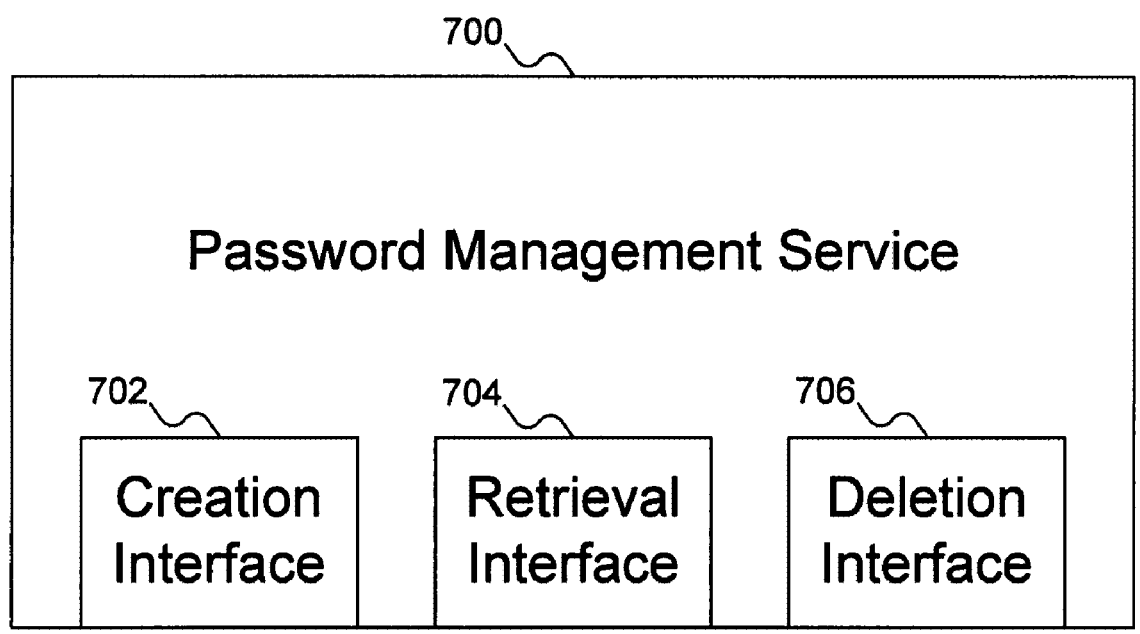
FIG. 7 shows an example of a password management service in accordance with certain implementations of the disclosed technology.

FIG. 7 shows an example of a password management service (PWMS) 700 in accordance with certain implementations of the disclosed technology. The exemplary PWMS 700 is suitable for running on a computer having a properly configured smart card reader. In the example, the PWMS 700 has multiple service interfaces 702-706 for manipulating (e.g., creating, editing, or deleting) passwords.

The exemplary PWMS 700 has a password creation interface 702 that can be used to request the creation of a new password. In certain embodiments, the password creation interface 702 can define the required password length in characters as well as a password nickname. As used herein, a password nickname generally refers to a user-defined string used to identify the password.

The exemplary PWMS 700 also has a password retrieval interface 704 that can be used to request the retrieval of a previously-generated password. In certain embodiments, the password nickname (e.g., specified at the time of the password's creation) can be used to identify the desired password.

The exemplary PWMS 700 also has a password deletion interface 706 that can be used to request the deletion of a particular password. In certain embodiments, the password nickname (e.g., specified at the time of the password's creation) can be used to identify the desired password.

In the example, the PWMS 700 relies on two different types of configuration data: a list of trusted Certificate Authorities (i.e., trusted root certificates), and a designation of which certificate revocation checking method to use. For example, the certificate revocation checking method can be a Certificate Revocation List (CRL) checking method or an Online Certificate Status Protocol (OCSP) checking method. Alternatively, the configuration data can specify that no certificate revocation checking method should be used.

Figure 8A:
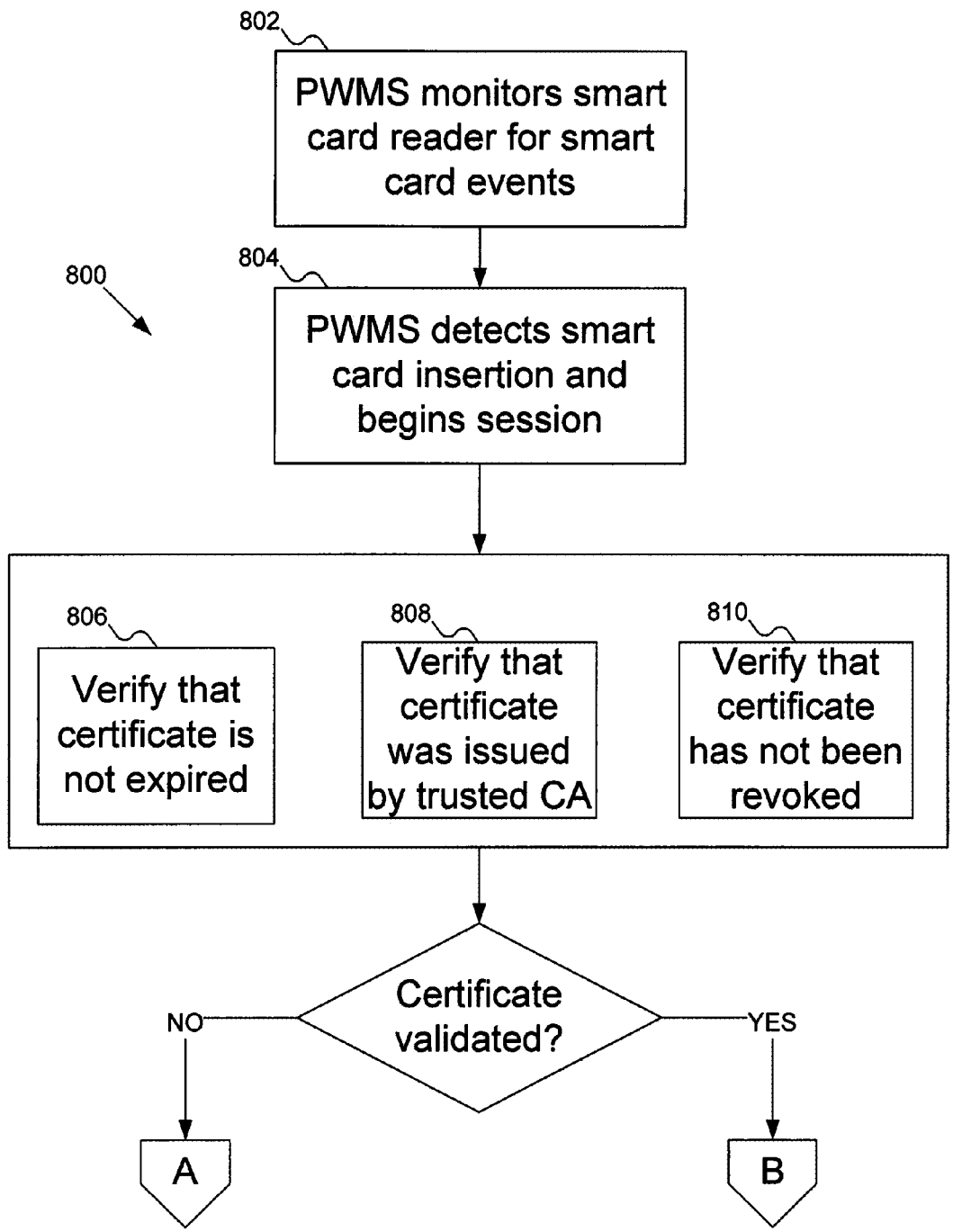
FIG. 8 shows an example of a method of password management using a password management service in accordance with certain implementations of the disclosed technology.
Figure 8B:
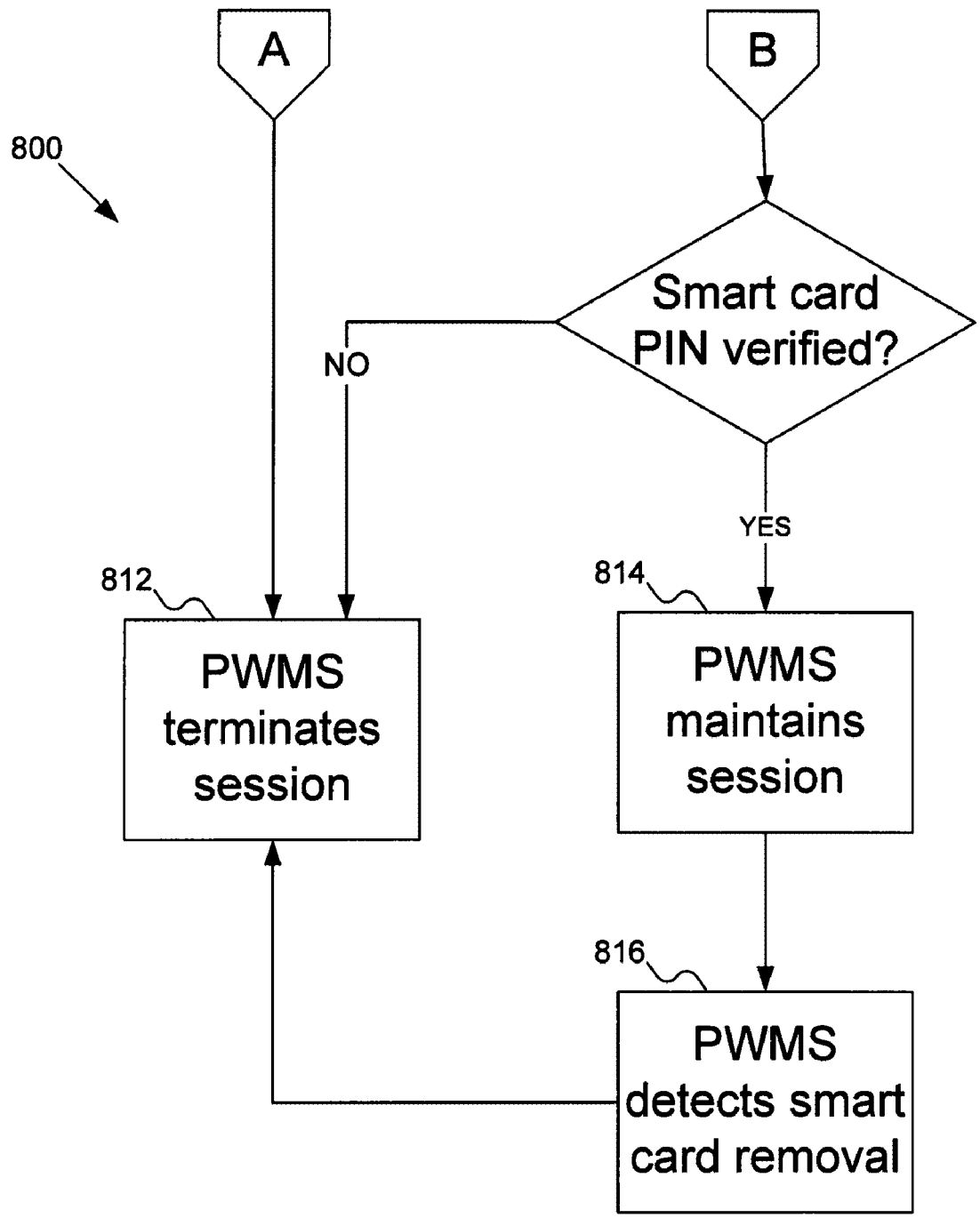

FIG. 8 shows an example of a method 800 of password management using a PWMS (e.g., the PWMS 700 of FIG. 7) in accordance with certain implementations of the disclosed technology.

At 802, the PWMS monitors the smart card reader for smart card events such as smart card insertion events and smart card removal events, for example. When a smart card is inserted, the PWMS detects the event and begins a session, as shown at 804, by enumerating the X509 certificate on the smart card and attempting to validate the certificate.

In the example, the PWMS attempts to validate the certificate by performing three verifications 806-810. The PWMS can verify that the certificate is not expired (e.g., by checking the certificate's "valid from" and "valid to" date ranges), as shown at 806. The PWMS can also verify that the certificate was issued by a trusted Certificate Authority (CA), as shown at 808. In addition, the PWMS can verify that the certificate has not been revoked (e.g., using a specified certificate revocation checking method), as shown at 810.

If the PWMS is unable to validate the certificate, the PWMS terminates the session and refuses to respond to subsequent requests for passwords, as shown at 812.

If the PWMS is able to validate the certificate, the PWMS then attempts to verify the smart card PIN. In the example, the PWMS can perform the PIN verification by collecting the smart card PIN and presenting it to the smart card for validation.

If the smart card PIN validation fails, the PWMS closes the session and refuses to respond to subsequent requests for passwords, as shown at 812.

If the smart card PIN validation is successful, the PWMS maintains the session and continues monitoring the smart card reader for smart card events, as shown at 814.

When the smart card is removed from the smart card reader, the PWMS detects the smart card removal event, as shown at 816. The PWMS then closes the session and refuses to respond to subsequent requests for passwords, as shown at 812.

Figure 9:
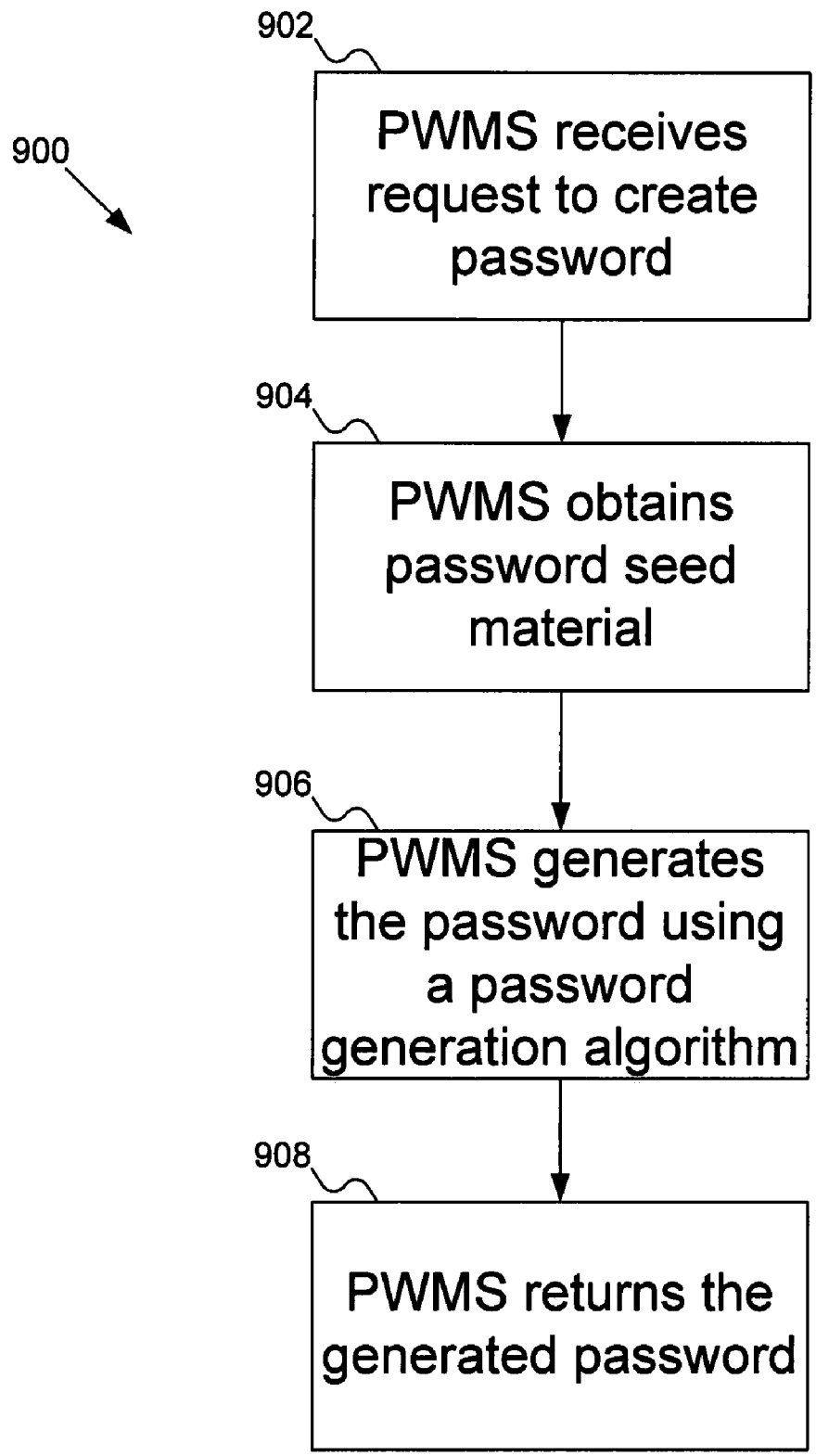
FIG. 9 shows an example of a method of generating a password using a password management service in accordance with certain implementations of the disclosed technology.

FIG. 9 shows an example of a method 900 of generating a password using an PWMS (e.g., the PWMS 700 of FIG. 7) in accordance with certain implementations of the disclosed technology.

At 902, the PWMS receives a request to create a password. The request can include information pertaining to password length (e.g., in characters) and password nickname.

At 904, the PWMS obtains password seed material (i.e., a sequence of random data). In certain embodiments, the length of the material is n-octets (8 bits) where n is greater than or equal to the specified password length.

At 906, the PWMS uses a password generation algorithm to generate the requested password using an X509 certificate. For example, the password generation algorithm can receive the following as inputs: password length x, seed material (i.e., n-octets (8 bits) of random data), and an X509 certificate's RSA private key. In the example, the length of the seed material is greater than or equal to the password length and a multiple of 3. An exemplary formula for calculating n is as follows:

$$n=(x+2)-((x+2)\%3)).$$

The PWMS can generate the password by performing an RSA encryption of the seed material (e.g., using the certificate's private key), Base64 encoding the result, and using the first x characters of the result as the password. The Base64 encoding advantageously ensures that the password contains printable characters (as users must typically be able to enter their passwords into a computer system). Also, the length of the seed material is a multiple of 3 to desirably ensure that no Base64 padding characters are used.

In the example, the algorithm desirably has at least the following two properties: (1) given the same input, the algorithm produces the same output; and (2) the algorithm can use the RSA private key associated with the certificate to create the password. This arrangement advantageously ensures that the password can be re-created and that the created password is linked to the RSA private key.

At 908, the PWMS returns the generated password to the requestor.

In certain embodiments, a password management service and associated data store (e.g., stored in a central repository) can support multiple users having network service available from virtually any connected location.

In certain embodiments, materials for password generation (e.g., seed material such as random data and password attributes such as password length and password nickname) can be stored and managed in a data store for future use. For example, the data can be stored in an XML document that can desirably associate the data with an X509 certificate so that, for example, the data can be easily returned upon request.

The storing of password materials in an XML document can include converting the binary information to Base64 encoding and providing a digital signature for validation purposes (e.g., to ensure that the stored materials have not been modified). When retrieved for later use, the data can be Base64 decoded.

Exemplary XML document elements for use in connection with implementations of the disclosed technology are as follows:

<password_store> Element:

The <password_store> element is the topmost or root element of the XML document and generally describes a primary purpose of the data. This element also has the following child elements: <certificate> and <password_list> (both of which are discussed below).

<certificate> Element:

The <certificate> element identifies the X509 certificate that is associated with the password data and contains the following elements: <serial_number>, <issuer>, and <digital_signature>.

The <digital_signature> element (discussed below is used to validate that the data has not been modified. The elements <serial number> (i.e., the certificate's serial number encoded as a printable hex string) and <issuer> (i.e., the certificate's issuer) are used in the signature.

<password_list> Element:

The <password_list> element is a list of passwords in the XML document and can contain one or more <password> elements (discussed below).

<password> Element:

The <password> element identifies an individual password and contains the following elements: <nickname>, <length>, <seed_material>, and <digital_signature>. The <digital_signature> element (discussed below) is used to validate that the data has not been modified. The elements <nickname> (i.e., the password nickname provided by the user), <type>, <length> (i.e., the length of the password expressed in characters), and <seed_material> (i.e., the password's seed material, such as random data, that is Base64 encoded) are used in the signature.

<digital_signature> Element:

The <digital_signature> element is used for validation purposes. The actual signature is generated by concatenating the listed elements and performing a digital signature using the private key for the X509 certificate. Before using the data, the signature is verified to ensure that tampering has not occurred. The signature is binary data and can be Base64 encoded before being stored in the XML document. The signature can be retrieved and Base64 decoded before being verified.

The <digital_signature> contains the following elements: <method> (i.e., the method used to create the signature, such as SHA-1 with RSA encryption), <elements> (i.e., the names of the elements, generally space delimited, whose values are concatenated and signed), and <value> (i.e., the signature data, Base64 encoded).

An example of an XML document for use in connection with implementations of the disclosed technology is as follows:

```
<?xml version="1.0" encoding="UTF-8" ?>
<password_key_store>
  <certificate>
    <serial_number> 0a7ca9e6 </serial_number>
    <issuer> My Favorite Certificate Authority </issuer>
    <digital_signature>
      <type> SHA-1 with RSA encryption </type>
      <elements> serial_number issuer </elements>
      <value>
        <![CDATA[ZIhvcNAQEFBQAwajELMAkGA1
        UEBhMCVVMx]]>
      </value>
    </digital_signature>
  </certificate>
  <password_list>
    <password>
      <nickname> email password </nickname>
      <length> 15 </length>
      <seed_material>
        <![CDATA[ZIhvcNAQEFBQAwajELMAkGA1
```

-continued

```
        UEBhMCVVMx]]>
      </seed_material>
      <digital_signature>
        <type> SHA-1 with RSA encryption </type>
        <elements> nickname length seed_material </elements>
        <value>
          <![CDATA[ZIhvcNAQEFBQAwajELMAkGA1
          UEBhMCVVMx]]>
        </value>
      </digital_signature>
    </password>
    <password>
      <nickname> network password </nickname>
      <length> 12 </length>
      <seed_material>
        <![CDATA[ ZIhvcNAQEFBQAwajELMAkGA1
        UEBhMCVVMx]]>
      </seed_material>
      <digital_signature>
        <type> SHA-1 with RSA encryption </type>
        <elements> nickname length seed_material </elements>
        <value>
          <![CDATA[ZIhvcNAQEFBQAwajELMAkGA1
          UEBhMCVVMx]]>
        </value>
      </digital_signature>
    </password>
  </password_list>
</password_store>
```

Figure 10:
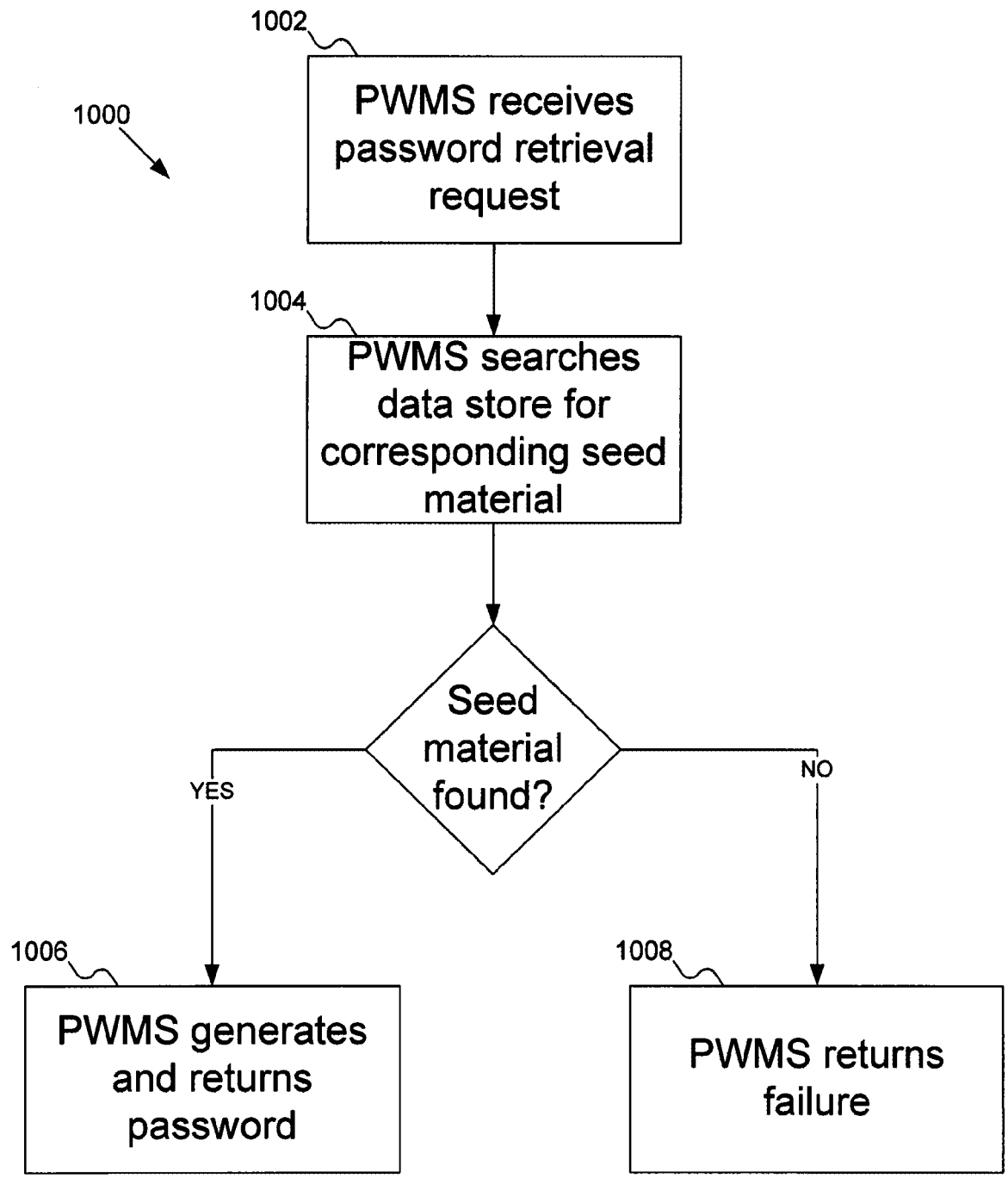
FIG. 10 shows an example of a method of retrieving a password using a password management service in accordance with certain implementations of the disclosed technology.

FIG. 10 shows an example of a method 1000 of retrieving a password using a PWMS (e.g., the PWMS 700 of FIG. 7) in accordance with certain implementations of the disclosed technology.

At 1002, the PWMS receives a password retrieval request. The request can contain the nickname of the desired password.

At 1004, the PWMS searches the data store for seed material that corresponds to the password nickname and is associated with the smart card certificate.

If the seed material is found, the password is generated (as discussed above) and returned, as shown at 1006.

If the seed material is not found, a failure is returned, as shown at 1008.

Figure 11:
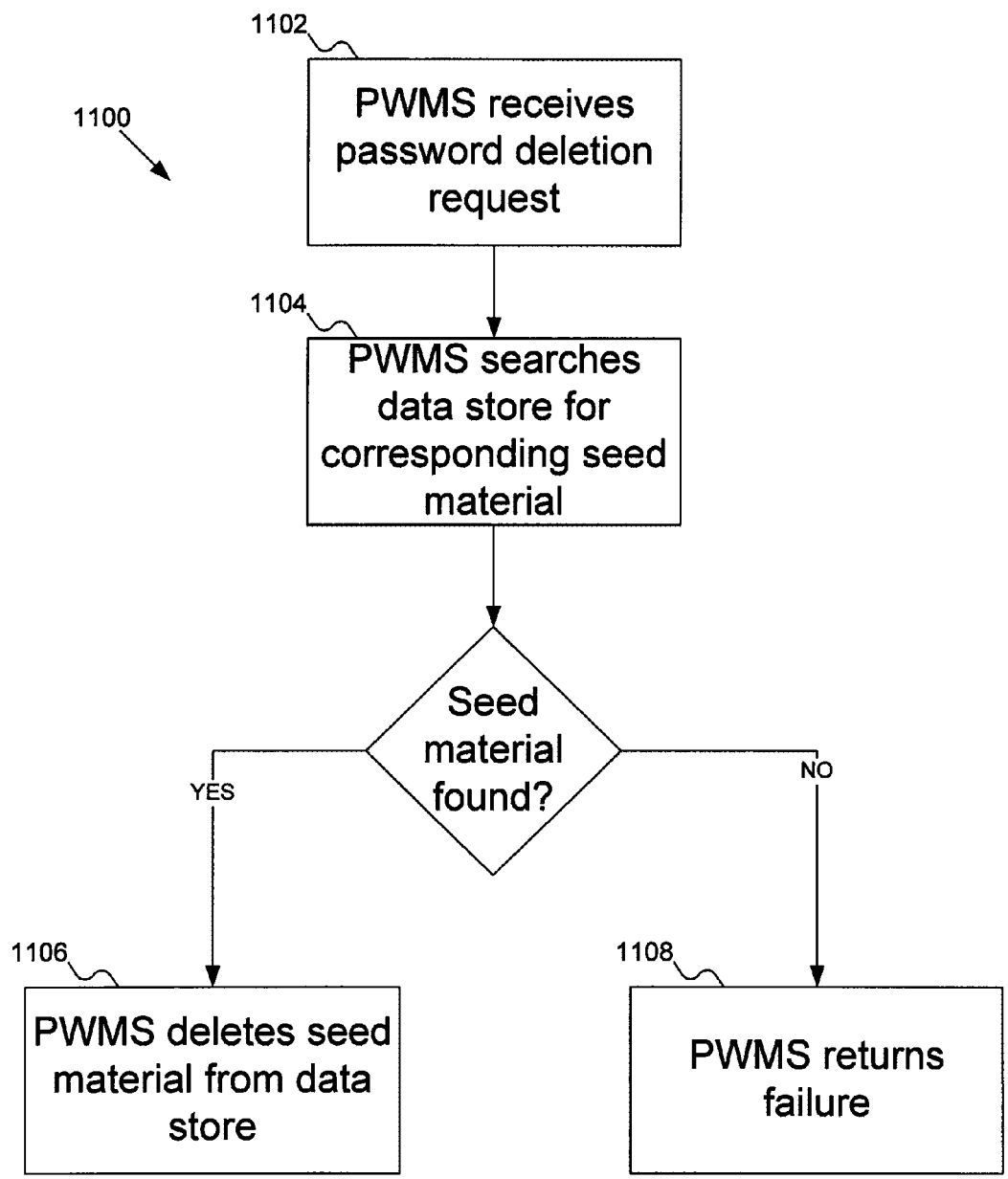
FIG. 11 shows an example of a method of deleting a password using a password management service in accordance with certain implementations of the disclosed technology.

FIG. 11 shows an example of a method 1100 of deleting a password using a PWMS (e.g., the PWMS 700 of FIG. 7) in accordance with certain implementations of the disclosed technology.

At 1102, the PWMS receives a password deletion request. The request can contain the nickname of the password to be deleted.

At 1104, the PWMS searches the data store for seed material that corresponds to the password nickname and is associated with the smart card certificate.

If the seed material is found, the seed material is deleted from the data store, as shown at 1106.

If the seed material is not found, a failure is returned, as shown at 1108.

Exemplary Machines

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
a smart card reader operable to receive a smart card, the smart card having an X509 certificate; and
a smart card based encryption key management system operable to detect an insertion of the smart card into the smart card reader and, responsive to detecting the insertion, initiate a current session and attempt to validate the X509 certificate by verifying that the X509 certificate has not expired, verifying that the X509 certificate was issued by a trusted Certificate Authority (CA), and verifying that the X509 certificate has not been revoked, wherein the smart card based encryption key management service is further operable to, responsive to a successful validation of the X509 certificate, attempt to verify a PIN corresponding to the smart card and, responsive to a successful verification of the PIN, maintain the current session with the smart card, the smart card based encryption key management system comprising:
an encryption key creation interface operable to generate an encryption key based on encryption key seed material responsive to an encryption key creation request;
an encryption key retrieval interface operable to locate the encryption key seed material and re-generate the encryption key responsive to an encryption key retrieval request; and
an encryption key seed material validation mechanism operable to verify that the encryption key seed material has not been modified.

2. The apparatus of claim 1, wherein the smart card based encryption key management system further comprises an encryption key deletion interface operable to delete the encryption key seed material responsive to an encryption key deletion request.

3. The apparatus of claim 1, wherein the smart card based encryption key management system is further operable to detect a removal of the smart card from the smart card reader and, responsive to detecting the removal, terminate the current session.

4. A computer-implemented method, comprising:
a processor detecting an insertion of a smart card into a smart card reader;
responsive to the detecting, the processor initiating a current session and attempting to validate the X509 certificate, wherein the attempting to validate comprises:
verifying that the X509 certificate has not expired;
verifying that the X509 certificate was issued by a trusted Certificate Authority (CA); and
verifying that the X509 certificate has not been revoked;
responsive to a successful validation of the X509 certificate, the processor attempting to verify a PIN corresponding to the smart card;
responsive to a successful verification of the PIN, the processor maintaining the current session with the smart card;
generating an encryption key based on encryption key seed material responsive to an encryption key creation request;
locating the encryption key seed material and re-generating the encryption key responsive to an encryption key retrieval request; and
verifying that the encryption seed material has not been modified.

5. The computer-implemented method of claim 4, further comprising deleting the encryption key seed material responsive to an encryption key deletion request.

6. A tangible, non-transitory computer-readable medium storing instructions that, when executed by the processor, result in the computer-implemented method of claim 4.

7. The computer-implemented method of claim 4, further comprising:

the processor generating a password corresponding to the smart card based at least in part on the X509 certificate and password seed material.

8. The computer-implemented method of claim 7, wherein generating the password is responsive to a password creation request.

9. The computer-implemented method of claim 7, further comprising locating the password seed material and re-generating the password responsive to a password retrieval request.

10. The computer-implemented method of claim 7, further comprising deleting the password seed material responsive to a password deletion request.

11. An apparatus comprising:
- a smart card reader operable to receive a smart card, the smart card having an X509 certificate;
- a smart card based encryption key management system operable to detect an insertion of the smart card into the smart card reader and, responsive to detecting the insertion, initiate a current session and attempt to validate the X509 certificate by verifying that the X509 certificate has not expired, verifying that the X509 certificate was issued by a trusted Certificate Authority (CA), and verifying that the X509 certificate has not been revoked, wherein the smart card based encryption key management service is further operable to, responsive to a successful validation of the X509 certificate, attempt to verify a PIN corresponding to the smart card and, responsive to a successful verification of the PIN, maintain the current session with the smart card; and
- a smart card based password management system operable to generate a password corresponding to the smart card based at least in part on the X509 certificate and password seed material, the smart card based password management system comprising:
- a password creation interface operable to generate the password responsive to a password creation request;
- a password retrieval interface operable to locate the password seed material and re-generate the password responsive to a password retrieval request; and
- a password seed material validation mechanism operable to verify that the password seed material has not been modified.

12. The apparatus of claim 11, wherein the smart card based password management system further comprises a password deletion interface operable to delete the password seed material responsive to a password deletion request.

* * * * *

UNITED STATES PATENT AND TRADEMARK OFFICE
CERTIFICATE OF CORRECTION

PATENT NO. : 8,369,521 B2
APPLICATION NO. : 12/253860
DATED : February 5, 2013
INVENTOR(S) : Ward It is certified that error appears in the above-identified patent and that said Letters Patent is hereby corrected as shown below:

In the Specifications

In column 11, line 10, delete "<serial number>" and insert -- <serial_number> --, therefor.

Signed and Sealed this
Seventh Day of May, 2013

Teresa Stanek Rea
*Acting Director of the United States Patent and Trademark Office*